United States Patent [19]

Cliffgard

[11] Patent Number: 4,656,464

[45] Date of Patent: Apr. 7, 1987

[54] LIQUID LEVEL DETECTOR

[76] Inventor: Arnie L. Cliffgard, 9268 Daisy Ave., Fountain Valley, Calif. 92708

[21] Appl. No.: 769,440

[22] Filed: Aug. 26, 1985

Related U.S. Application Data

[63] Continuation-in-part of Ser. No. 706,131, Feb. 27, 1985, abandoned.

[51] Int. Cl.$^4$ .......................... G08B 21/00; B60Q 1/00
[52] U.S. Cl. ...................................... 340/622; 73/295; 340/59
[58] Field of Search ................. 340/622, 59, 620, 618; 73/295, 304 R

[56] References Cited

U.S. PATENT DOCUMENTS

| | | | |
|---|---|---|---|
| 3,631,440 | 12/1971 | Cliffgard | 340/622 |
| 3,740,740 | 6/1973 | Milo | 73/295 X |
| 4,361,037 | 11/1982 | Hauschild et al. | 73/295 |

Primary Examiner—James L. Rowland
Assistant Examiner—Daniel Myer
Attorney, Agent, or Firm—Spensley Horn Jubas & Lubitz

[57] ABSTRACT

A liquid level detector comprising a voltage-divider network, including a thermistor, connected between the terminals of a battery so that the potential at the voltage-divider output varies as a function of the resistance of the thermistor. The voltage-divider output is connected to the input of a voltage-sensitive switching circuit. The voltage-sensitive switching circuit has two stable states and is either in one state or the other depending upon whether the potential at the voltage-divider output is above or below a reference level. When the potential at the voltage-divider output indicates that the thermistor is out of a good heat conductor such as a liquid, the switching circuit closes a series circuit between the battery and an LED provide a visual indication of the low liquid level condition. The thermistor is supplied by means of a constant current source to prevent destruction of the thermistor in the event of a sharp battery voltage increase. Self-testing circuitry is included to test the operation of the circuit without requiring a separate connection to the ignition.

3 Claims, 3 Drawing Figures

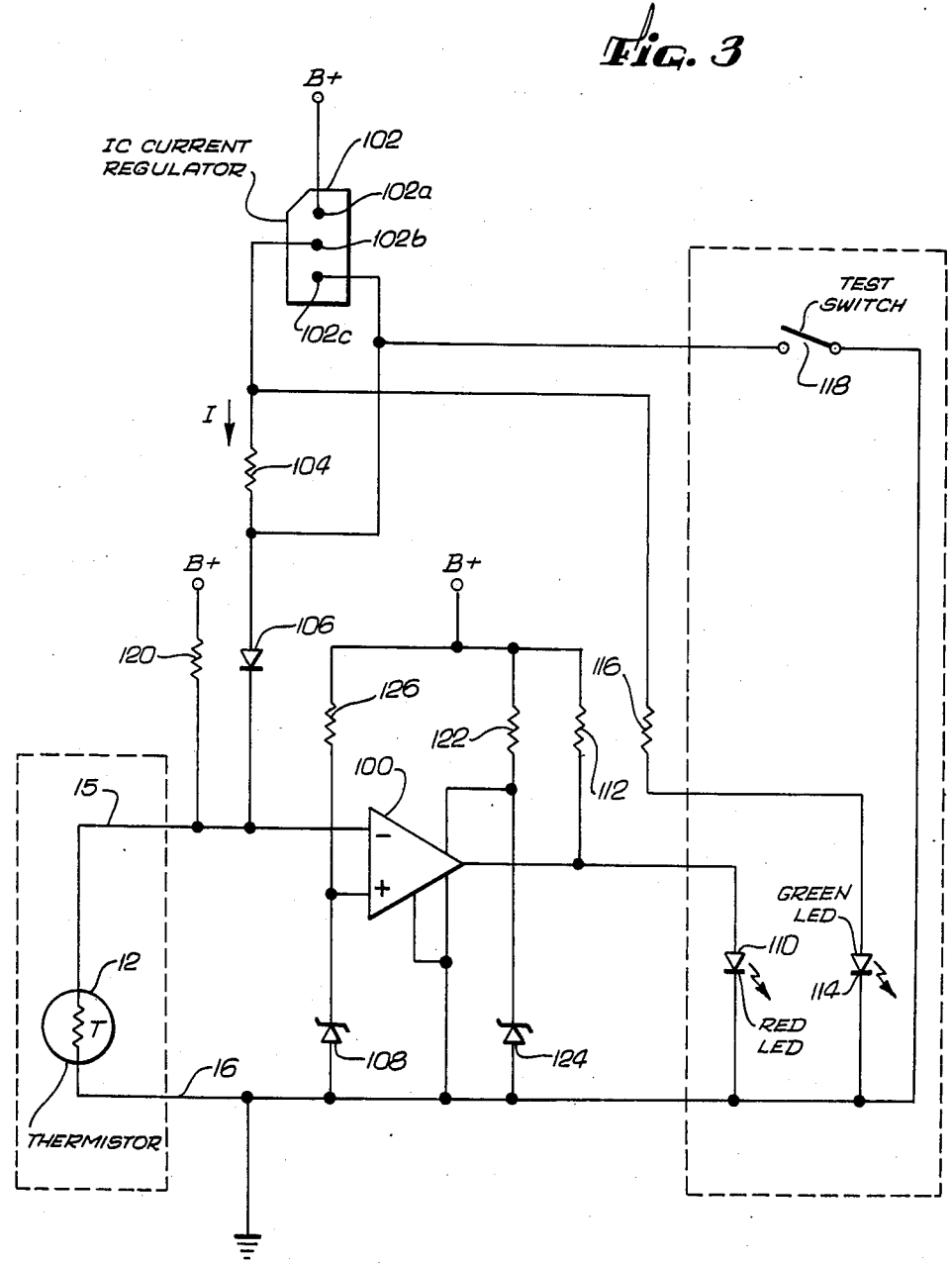

LIQUID LEVEL DETECTOR

CROSS REFERENCE TO RELATED APPLICATION

This application is a continuation-in-part of application Ser. No. 706,131, filed Feb. 27, 1985, now abandoned.

2. Field of the Invention

The present invention relates to a liquid-level detector and, more particularly, to a circuit for determining and indicating when the level of liquid in a container goes below a predetermined level.

3. Description of the Prior Art

Systems of the type to which the present invention relates, which operate to indicate the presence or absence of a liquid at a predetermined level, are useful in a variety of situations. For example, the present liquid level detector and indicator may be used to indicate whether the coolant level in the radiator of an automobile, truck, tractor, or any other internal combustion engine is at or below a predetermined level. The present device would be especially useful in such an environment since modern automobiles typically have only a warning light which indicates when the engine temperature has exceeded a predetermined maximum value. However, such an indication results suddenly without adequate warning for the driver of the automobile to take suitable preventive measures. On the other hand, with the present device, as soon as the coolant level in the radiator became low, the operator would have a warning that additional coolant was required and it would not be necessary to wait until the radiator overheated.

Many other situations would similarly benefit from a liquid level detector. As examples, the present device may be used as a brake fluid level alarm, a gasoline low-level alarm, an oil level low-level alarm, a water tank level alarm for campers and house trailers, a butane tank level alarm for campers and house trailers, and a battery water level alarm. In addition, many other possible uses for a device which indicates when the liquid level in a tank goes below a predetermined level will become immediately apparent to those skilled in the art.

Many different types of circuits have been proposed to perform this function in one or more of these environments. Many of these circuits have used a thermistor, which is an electrical resistance element whose ohmic value varies inversely with its temperature, as the sensing element. A thermistor is an ideal sensing element since with current flowing therethrough, its temperature will rise due to self-heating, thereby causing its resistance to decrease exponentially. With the thermistor immersed in a poor heat conductor, such as air, the temperature continues to rise until equilibrium is reached where the heat generated in the thermistor is dissipated as fast as it is created. On the other hand, when the thermistor is cooled by some fluid such as water or oil, its resistance value remains relatively high.

Although many circuits exist which utilize a thermistor for liquid level detection, many problems exist with these circuits which make them quite impractical. In the first instance, most prior art circuits are quite complex, bulky and expensive. Another typical problem with available liquid level detectors is that they are often sensitive to supply voltage fluctuations. This represents a significant problem where the device is used in an automobile since the battery voltage in a typical automobile varies by as much as 3 to 5 volts under normal driving conditions.

U.S. Pat. No. 3,631,440, issued to the present applicant, discloses a circuit which has a minimum number of circuit components so that it may be easily manufactured and provided at a relatively low price. Briefly, the circuit disclosed therein consists of a resistor and a thermistor connected in series between the plus and minus terminals of an automobile battery so that the voltage at the junction between the resistor and thermistor varies depending upon whether the thermistor is immersed in a good or bad heat conductor. The junction between the resistor and thermistor is connected to the input of a voltage-sensitive switching circuit which is connected directly to the positive terminal of the car battery and through a Zener diode to the negative terminal of the automobile battery. The Zener diode provides a reference voltage which is independent of current. The voltage-sensitive switching circuit has two stable states and is either in one state or the other depending upon whether the voltage at the junction between the thermistor and resistor is above or below a predetermined reference level. When the voltage at the junction indicates that the thermistor is out of the liquid, the switching circuit closes a series circuit between the car battery and a lamp so that the lamp provides a visual indication of the low liquid level condition.

The circuit of the patent includes a self-testing feature which enables the circuit to be tested each time the automobile ignition is operated. The circuit is connected to the accessory on-off switch of the ignition in such a way as to cause power to be removed from the thermistor upon operation of the ignition, thus simulating a low liquid level condition.

Although the system of the above-described patent has substantial advantages over other prior art liquid level detectors, it has several problems in practical applications. First, although it is generally insensitive to supply voltage (vehicle battery) variations, a sharp increase in voltage such as might be caused by an alternator malfunction can result in an increase in current through the thermistor sufficient to destroy it. Second, the system required a connection to an accessory terminal of the ignition to provide the self-test operation. Not only is this terminal often very difficult to reach, thus rendering installation of the system complicated, the configuration only enables self-checking during ignition.

SUMMARY OF THE INVENTION

The present invention provides several improvements to the circuit of U.S. Pat. No. 3,631,440 which results in substantial practical improvements. Instead of simply providing a resistor between one of the battery terminals and the thermistor, a constant current source integrated circuit is employed. Current through the thermistor is therefore prevented from increasing to a level which could destroy the thermistor.

The present invention replaces the accessory switch of the prior patent with a one-shot activated transistor switch which automatically tests the system each time power is applied to the system. Circuitry is also included to enable the self-testing operation to be performed at any time, and indicator means are provided to provide a positive indication that a checking operation is being performed.

In an alternate embodiment, a circuit is provided in which discrete components are replaced by integrated circuits in order to substantially simplify the circuit complexity. Cost is kept to an absolute minimum, while performance is actually improved in that greater variations in supply voltage can be accommodated. Test circuitry is included to verify proper operation of the circuit.

BRIEF DESCRIPTION OF THE DRAWINGS

FIG. 3 is a schematic circuit diagram of an alternate embodiment of the invention.

DESCRIPTION OF THE PREFERRED EMBODIMENT

Figure 1:
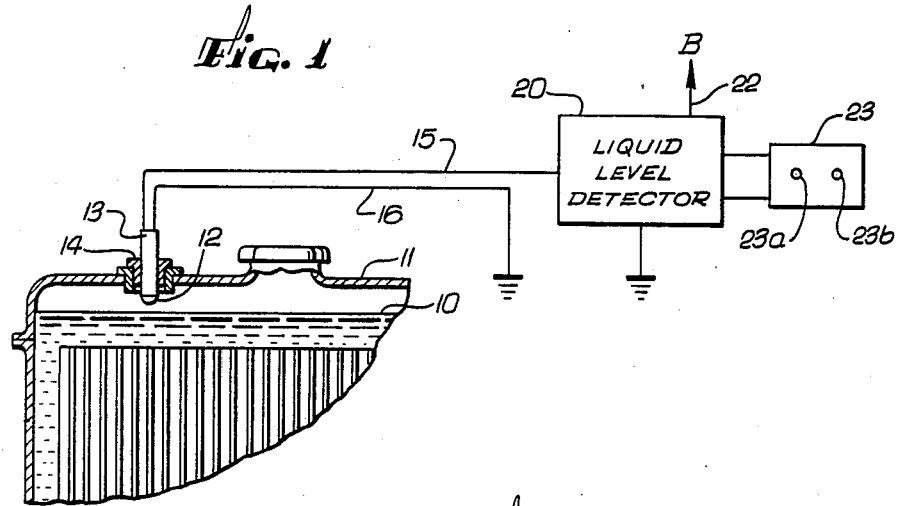
FIG. 1 is a diagram, partly in section, illustrating the manner in which the present liquid level detector may be used in connection with an automobile radiator.

Referring now to the drawings and, more particularly, to FIG. 1 thereof, the present liquid level detector, generally designated 20, may be utilized, by way of example, to monitor the level of a liquid 10 in a tank 11 such as the radiator of an automobile, truck, tractor or any other internal combustion engine. In order to monitor the level of liquid 10, a thermistor 12 attached to a suitable support 13 is mounted in radiator 11 by bracket means 14 so that thermistor 12 is at the desired level of coolant 10. With an electrical signal passing through thermistor 12, its resistance will indicate whether it is immersed in liquid 10 or whether it is immersed in air. When immersed in a poor heat conductor such as air, the resistance of thermistor 12 will be quite low. On the other hand, when thermistor 12 is cooled by liquid 10 in radiator 11, its resistance will be relatively high.

Electrical connection may be made to thermistor 12 via electrical leads 15 and 16. Lead 16 may be connected to a first source of reference potential such as the negative terminal of the vehicle's battery which, it will be assumed for the purpose of this application, is connected to ground. Lead 15 is connected to the input of liquid level detector and indicator 20 which has output lead 22 and a visual indicating device 23 providing indications of low coolant level (23a) and self-checking in progress (23b). Output lead 22 is connected to a terminal B which is connected to a second source of reference potential such as the positive ignition coil terminal on the vehicle's ignition switch.

Figure 2:
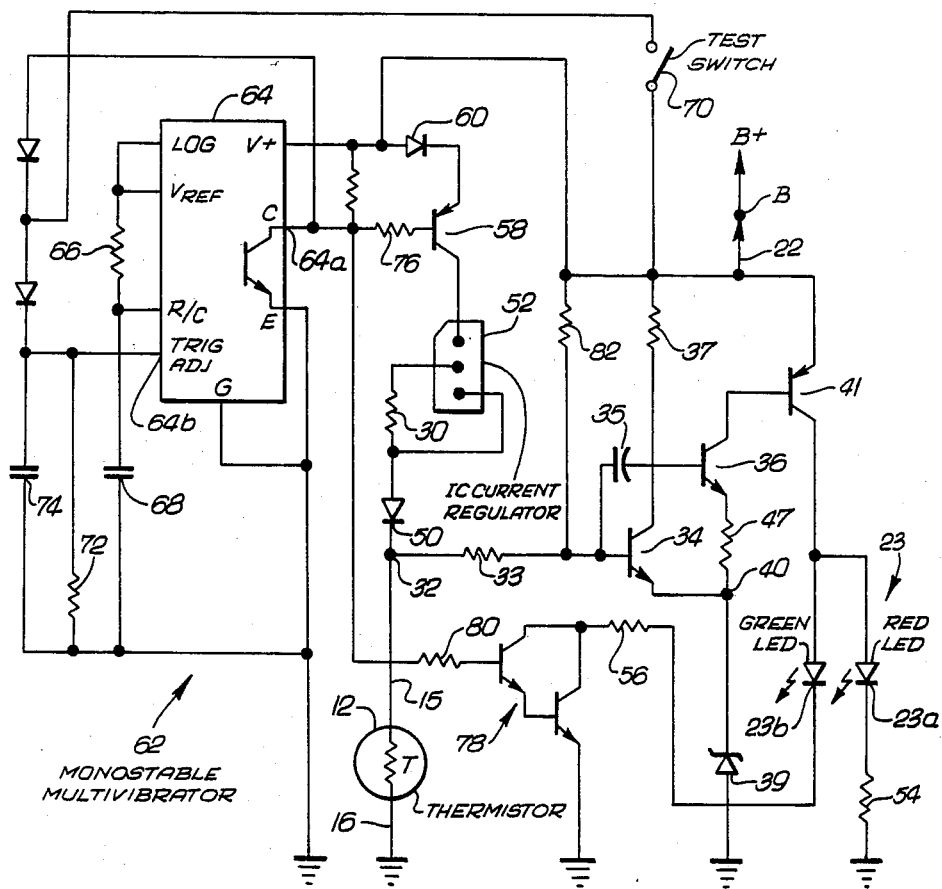
FIG. 2 is a schematic circuit diagram of a device constructed in accordance with the teachings of the present invention.

Referring now to FIG. 2, liquid level detector 20 consists of resistor 30 and a diode 50 connected in series between an integrated circuit current regulator 52 which regulates the current through the resistor 30 and lead 15 of thermistor 12. The junction 32 between thermistor 12 and diode 50 is connected to one end of a resistor 33, the other end of which is connected to the base of a transistor 34. The collector of transistor 34 is connected via a capacitor 35 back to its base. The collector of transistor 34 is also connected to the base of a transistor 36 and to one end of a resistor 37, the other end of which is connected to output lead 22. The emitter of transistor 36 is connected to one end of a resistor 47, the other end of which is connected to the cathode of a Zener diode 39, the anode of which is connected to ground. The junction 40 between resistor 47 and diode 39 is connected to the emitter of transistor 34. The collector of transistor 36 is connected to the base of a transistor 41, the emitter of which is connected to output lead 22. The collector of transistor 41 is connected to one terminal of LEDs 23a and 23b, the other terminal of which is connected to resistors 54 and 56, respectively.

In operation, the current through resistor 30 is maintained constant by regulator 52 and the potential at junction 32 is high with respect to ground when thermistor 12 is cooled by some fluid such as water, oil, etc. On the other hand, when thermistor 12 is immersed in a poor heat conductor such as air, its temperature rises due to self-heating and causes its resistance to decrease exponentially. Thus, as the temperature of thermistor 12 rises, the potential at junction 32 decreases until equilibrium is reached where the heat generated in thermistor 12 is dissipated as fast as it is generated. Thus, the potential 32 indicates whether thermistor 12 is immersed in a fluid or a gas.

The present circuit monitors the voltage at junction 32 and turns LED 23a on or off for low or high potentials, respectively. Assuming first that thermistor 12 is in liquid 10, the potential at junction 32 will be higher than the potential at junction 40, the potential at the latter point being determined principally by the characteristics of Zener diode 39 plus the base-emitter voltage of transistor 34. Accordingly, under normal conditions, transistor 34 is conducting. Since the collector-to-emitter saturation voltage of transistor 34 is generally quite low, transistor 34 acts as a first switch element holding transistor 36 off. Finally, with transistor 36 being non-conducting, transistor 41 cannot conduct and lamp 23 remains unlit. In this sense, transistor 36 acts as a second switch element holding transistor 41 off.

When the level of liquid 10 in radiator 11 is lowered, such that thermistor 12 is surrounded by gas, its temperature rises and its resistance lowers so that the potential at junction 32 approaches ground. As the potential at junction 32 approaches the reference potential at junction 40, transistor 34 starts to turn off. As the voltage at the collector of transistor 34 rises, the current through resistor 37 begins to bias transistor 36 on. In addition, the feedback from transistor 36 to transistor 34 via resistor 47 which works against the impedance of Zener diode 39 serves to aid in turning transistor 34 off. As a result, there is a very rapid toggle action in which either transistor 34 or transistor 36 is on. Except during switching, either transistor 34 or transistor 36 supplies a current through Zener diode 39 so that Zener diode 39 can maintain junction 40 within a narrow range of voltage levels independently of supply voltage fluctuations. By proper selection of circuit values, the current through Zener diode 39 may be held close to a constant value as transistors 34 and 36 change from one state to another.

When transistor 36 conducts, it drives transistor 41 into saturation providing a closed series circuit between LED 23a and the vehicle battery so that LED 23a lights to indicate the low level of liquid 10 in radiator 11.

The current regulator 52 is connected to the positive voltage supply via a transistor 58 and a diode 60. During normal operation, the transistor 58 will be conductive to supply the current regulator 52 which in turn regulates the level of the current through the resistor 30 and thus limits the maximum possible current through the thermistor 12. In this fashion, large fluctuations in the battery voltage, such as might be caused by an alternator malfunction, will not destroy the thermistor 12, since the current regulator 52 prevents the increased battery voltage from increasing the current through the thermistor. For a nominal 12 volt system, the present invention can operate without difficulty even in the event that the battery voltage would increase to abnormally high levels such as 18 volts. The current provided to the thermistor 12 is a function of the voltage across the resistor 30 and the value of the resistor 30. The voltage is maintained at a constant level by the current regulator 52 and the resistance value chosen such that the current is generally maintained at approximately 0.06 amperes. The diode 50 protects the transistor 34 from high voltage spikes which might be caused by operation of the starter motor.

Self testing of the detector is facilitated by means of circuitry 62 including a timer 64 (such as a National Semiconductor Model LM3905), resistor 66 and capacitor 68 which form a monostable multivibrator (one shot) having an output at 64a and a trigger input at 64b. Upon the initial application of power to the timer 64, or upon the generation of a trigger signal accomplished by closing a momentary switch 70, which will generate a trigger signal. Capacitor 74 filters out electrical interference, and is restored to zero volts by means of a resistor 72 during periods of no triggering. The output 64a will be high for a period of time determined by the resistor 66 and capacitor 68. When the output 64a is high, the transistor switch 58, which is connected to the output via a resistor 76, will be open and the junction 32 will be low. This causes transistor 34 to turn off and transistor 36 to turn on which in turn causes transistor 41 to turn on. The turning on of transistor 41 causes a red LED 23a to be lit. The high output 64a also drives a transistor pair 78 through a resistor 80, and the turning on of the transistor 41 thus also causes the LED 23b to be energized by closing a path to ground through the resistor 56 and transistor pair 78. The LED 23b is a green LED and lights to show that a test condition exists, thus eliminating the possibility of a false low level indication occurring solely because of the operation of the test circuit. If the thermistor connection to line 15 or 16 is broken, the transistor 34 is turned on by means of a resistor 82. The transistor 36 will be off in this condition, thus causing the transistor 41 to be off and thereby preventing either of the LEDs 23a and 23b from lighting. After the period of the one shot has expired, the output 64a will go low, closing the switch 58 and causing both of the LEDs 23a and 23b to turn off. If the liquid level goes low, the resistance of the thermistor 12 will decrease and the red LED 23a will be lit as described above; however, the green LED 23b will not be lit since the output 64a of the trigger 64 is low and the transistor pair 78 is therefore turned off. The lighting of the red LED 23a alone therefore indicates a low level condition, whereas the lighting of both LEDs 23a and 23b indicates a test condition and proper operation of the circuit in the test condition. If the thermistor leads 15 and 16 are shorted, the LED 23b will go out when the output 64a goes low but the LED 23a will remain lit, thus indicating a fault. The circuit thus provides a fault indication for both short circuit and open circuit conditions of the thermistor 12.

The self-test circuitry 62 thus eliminates the need for a connection to the accessory terminal of an ignition switch. The switch 70 can be provided in any convenient location, and enables testing of the operation of the device at any time. Thus, the existing ignition harness in a vehicle need not be cut into and there is no need to turn the ignition switch off and then back on to accomplish self testing.

FIG. 3 illustrates an alternate embodiment of the invention in which the circuitry has been substantially simplified as compared to that of FIG. 2. In this circuit, an integrated circuit comparator 100 is employed to compare the voltage across the thermistor 12 with a reference voltage to determine when the liquid level has gone below the predetermined level. The circuit is designed such that a regulator 102 operating as a current source can be made to perform three functions, namely providing a constant current source to the thermistor 12, providing a voltage source to drive an indicator and facilitating testing of the device merely by shorting the constant current to ground.

When the thermistor 12 is immersed in liquid, the combination of the regulator 102 and a resistor 104 provide a trickle current through the thermistor essentially equal to the battery voltage divided by the resistance of the thermistor. The resistance of the thermistor at 25° C. is approximately 3000 ohms and a typical battery voltage is +13 volts. The trickle current in such a case would therefore be 0.0043 amps.

If the liquid level drops below the thermistor 12, the thermistor heats up and its resistance decreases, thereby allowing more current to flow through it. Ultimately, a current limit point is reached determined by the value of the internal reference voltage of the regulator 102 and the value of the resistor 104. The regulator 102 is a monolithic fixed voltage regulator which in the present embodiment has an internal reference voltage of 1.2 volts. The resistor 104 in the present embodiment has a value of 20 ohms and the maximum current is therefore 1.2 divided by 20, or 0.06 amps. Once this level is reached, the current through the thermistor 12 cannot increase regardless of further decreases in the resistance of the thermistor. This current limit is reached when the resistance of the thermistor attains a value of approximately 140 ohms. The current value will be maintained even if the battery voltage were to increase to, for example, 28 volts, thus providing substantial protection against unexpected voltage changes.

The regulator 102 is a three pin device having a pin 102a for receiving the unregulated input voltage of the battery, an output terminal 102b providing a regulated output and a common terminal 102c. Output current passing through the resistor 104 and a diode 106 passes through the thermistor 12. The voltage across the thermistor is applied to one input of the comparator 100. This voltage is compared to a voltage across a Zener diode 108. If the voltage across the thermistor is high due to it being immersed in liquid, the negative input of the comparator 100 will be high with respect to the positive input and the output of the comparator will thus be low. This maintains a red LED 110 in an off state, indicating a safe liquid level. If the liquid level is low, the thermistor will self heat, causing its resistance to decrease to a point where its voltage will be lower than that across the Zener diode 108, causing the output of the comparator 100 to switch high, thus allowing the LED 110 to be energized via a resistor 112. This indicates an alarm condition requiring remedial action.

A green LED 114 is employed to indicate when power is being applied to the thermistor and the liquid level is being monitored. The LED is driven via a resistor 116 connected to the output terminal of the regulator 102. During normal operation, the LED 114 will be lit, indicating that the regulator 102 is functioning properly and that power is being applied to the thermistor 12.

In order to test the operation of the circuit, a switch 118 is closed to ground the terminal 102c. Current will still flow through the resistor 104, but this current will be shunted through the switch 118 to ground. Since the terminal 102c is at ground, the diode 106 will be back biased and shut off. If the thermistor is open circuited, the voltage across a resistor 120 pulls the negative input to the comparator 100 higher than the positive input, causing the output of the comparator to go low and turn the red LED 110 off. However, if the thermistor 12 is properly connected, the resistance of the thermistor is low enough to pull the voltage at the negative input to the comparator 100 lower than the positive input, causing the output of the comparator to go high and turn on the LED 110, thus simulating a low liquid level condition.

It should be noted that if the thermistor probe or wiring from the circuit to the probe becomes shorted, the red LED 110 will be on continuously since the circuit cannot distinguish this condition from a low liquid level. In any event, it provides an indication that an alarm condition exists.

Thus, during normal operation the lighting of the green LED 114 alone indicates that the liquid level is satisfactory whereas the lighting of both the red LED 110 and green LED 114 indicates that the liquid level is low and/or a shorted probe or wire exists. When the test button 118 is pushed, the lighting of the red LED 110 alone indicates that the wiring and probe are properly operating. If the red LED does not light, it indicates an open probe or wire. In both instances, the green LED 114 will be off.

The comparator 100 is an integrated circuit comparator requiring a relatively constant and small current to power it. This is supplied via a large resistor 122 in series with the battery voltage, which is shunted at 12 volts by a Zener regulator 124, thus allowing the supply voltage to change widely without inhibiting the operation of the circuit.

In a particular embodiment of the circuit of FIG. 3 which has been constructed, the following components were employed:

Comparator 100—National Semiconductor LM311
Regulator 102—National Semiconductor LM317MP
Thermistor 12—3K ohms @25° C.
Resistors
 1.04—20 ohms
 112—620 ohms
 116—390 ohms
 120—20K ohms
 122—620 ohms
 126—430 ohms
Zener Diodes
 106—1N759A 12V
 108—1N748A 3.9V.

Of course, these component values are illustrative only and various other component values could be employed.

While the invention has been described with respect to a preferred physical embodiment constructed in accordance therewith, it will be apparent to those skilled in the art that various modifications and improvements may be made without departing from the scope and spirit of the invention.

What is claimed is:

1. A liquid level detector for determining when the level of liquid in a container goes below a peredetermined level, said detector being adapted for use with a voltage supply which provides first and second points of reference potential, the detector comprising:
  a current source and a thermistor connected in series between the first and second points of reference potential, said current source and thermistor having a junction therebetween, said current source being configured to provide a predetermined maximum amount of current through the thermistor regardless of fluctuations of the voltage supply, wherein the current source includes:
    an integrated circuit voltage regulator having an input terminal connected to the first point of reference potential, an output terminal and a common terminal;
    a first resistance having a first terminal connected to the output terminal and a second terminal connected to the common terminal; and
    a diode connected between the second terminal of the first resistance and the thermistor, wherein said diode is connected to permit current flow through the first resistance to the thermistor;
  reference means connected between the first and second points of reference potential for providing a third point of reference potential hving a predetermined potential difference with respect to the second point of reference potential;
  an integrated circuit comparator for comparing the potential at the junction between the current source and thermistor with the third point of reference potential; and
  a first indicator connected to the output of the comparator for indicating whether the liquid level is above or below the predetermined level, said comparator being operative to activate or deactivate the indicator depending upon whether the voltage at the junction is greater or less than the third point of reference potential.

2. A liquid level detector as in claim 1 including a second indicator coupled to the output terminal of the regulator, wherein the second indicator is activated or deactivated depending upon whether the voltage at the output terminal is above or below a predetermined level, wherein in normal operation said second indicator indicates whether current is being supplied to the thermistor.

3. A liquid level detector as in claim 2 wherein the first point of reference potential is a positive voltage and the second point of reference potential is ground, wherein the detector further includes:
  a second resistance connected between the junction of the diode and thermistor and the first point of reference potential; and
  a switch connected between the common terminal and the second point of reference potential for testing the detector, wherein when the switch is closed its voltage at the output terminal will fall to a level to cause the second indicator to indicate that the detector is being tested and the current through the first resistance will be shunted to ground to test the thermistor, wherein if the thermistor is properly operating the voltage at the junction will be less than the third point of reference potential and cause the first indicator to indicate as if the liquid level was below the predetermined level and wherein if the thermistor is open circuited the voltage at the junction will be greater than the third point of reference potential and cause the first indicator to indicate as if the liquid level was above the predetermined level.

* * * * *